United States Patent [19]
Carter

[11] 3,759,554
[45] Sept. 18, 1973

[54] PIPE COUPLINGS
[75] Inventor: Raymond Charles Carter, Sheffield, England
[73] Assignee: Hepworth Plastics Limited, Sheffield, Calif.
[22] Filed: Mar. 23, 1972
[21] Appl. No.: 237,359

[30] Foreign Application Priority Data
Apr. 21, 1971 Great Britain.................. 10,592/71

[52] U.S. Cl................... 285/260, 285/305, 285/423
[51] Int. Cl............................................. F16l 31/00
[58] Field of Search................... 285/305, 260, 423, 285/381

[56] References Cited
UNITED STATES PATENTS
3,606,402  9/1971   Medney............................. 285/305
3,545,794  12/1970  Wise................................. 285/423 X
3,260,540  7/1966   Houot............................... 285/423 X
3,662,761  5/1972   Hoffman........................... 285/423 X FOREIGN PATENTS OR APPLICATIONS
1,097,192  2/1967   Great Britain...................... 285/305
533,751    2/1941   Great Britain...................... 285/347

Primary Examiner—Dave W. Arola
Attorney—Lowe & King

[57] ABSTRACT

A pipe coupling for socketed and spigoted plastics pipes with a sealing ring between the socket and the inserted spigot does not have any groove cut for locating the sealing ring, instead a portion of the spigot spaced from its ultimate end is expanded so as to be a close sliding fit in the socket, and a plastics sleeve is secured within the expanded portion of the spigot, the sealing ring being located on the portion of the spigot between the expanded portion and the ultimate end of the spigot. The principle of the invention is extended to the formation of grooves for a locking rod by expanding a second portion of the spigot still further from the ultimate end of the spigot, with its own internal plastics sleeve or an extension of the sleeve in the first expanded portion, the two expanded portions forming between them a circumferential groove round the outside of the spigot, and by expanding a portion of the socket to form a mating circumferential groove round the inside of the socket, the locking rod being inserted through a hole in the socket tangential to the grooves.

4 Claims, 2 Drawing Figures

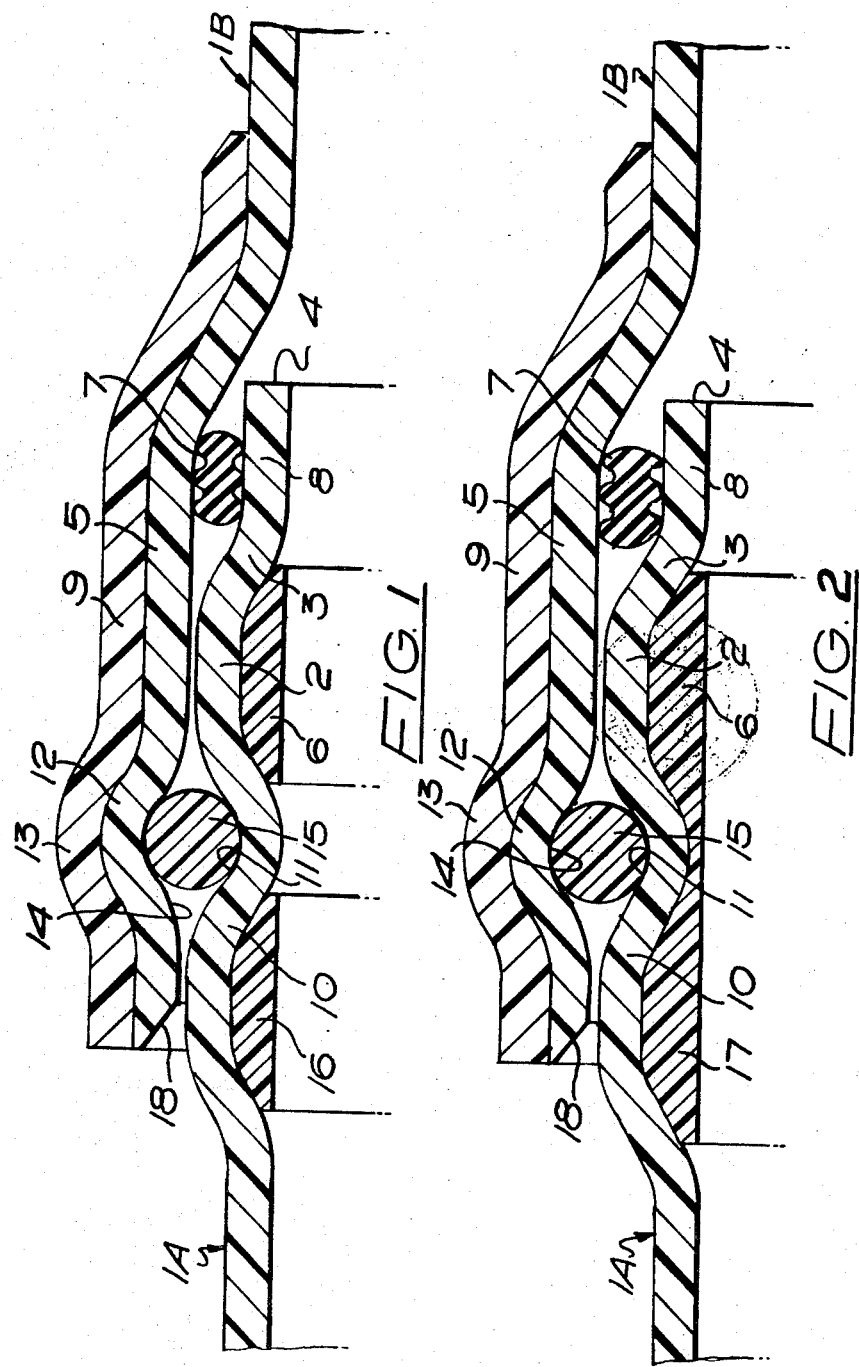

PIPE COUPLINGS

This invention relates to pipe couplings, more particularly for socketed and spigoted plastics pipes, and has for its object the elimination of cutting grooves for the location of sealing rings and locking rods.

According to the present invention, a pipe coupling for socketed and spigoted plastics pipes comprises a portion of the spigoted pipe-end spaced from its ultimate end expanded so as to be a close sliding fit in the socketed pipe-end, a plastics sleeve secured within the expanded portion, and a sealing ring located on the portion of the spigoted pipe-end between the expanded portion and the ultimate end of the spigoted pipe-end.

The sleeve prevents the expanded portion returning to its original diameter and, therefore, the expanded portion always serves to prevent the sealing ring from being forced out of the coupling by pressure from within the coupled pipes. The socketed pipe-end is preferably encircled by a collar, to enable it to retain its shape and withstand the pressure from within the coupled pipes.

A second portion of the spigoted pipe-end still further from the ultimate pipe-end is also expanded, the two expanded portions forming between them a circumferential groove round the outside of the spigoted pipe-end, and a portion of the socketed pipe-end is expanded to form a circumferential groove round the inside of the socketed pipe-end, which groove when mated with the groove round the spigoted pipe-end receives a flexible locking rod inserted through a hole in the socketed pipe-end tangential to the groove in the socketed pipe-end, to lock the coupling. A pull on one pipe is transmitted through the rod in the grooves in the pipe-ends to the other pipe.

The second expanded portion of the spigoted pipe-end is preferably provided with its own plastics sleeve or an extension of the sleeve in the first expanded portion, so that pushing of one pipe with respect to the other will not result in the locking rod rolling or pushing the second expanded portion back towards the original pipe diameter.

The ultimate end of the socketed pipe-end may be bevelled internally to provide a lead-in for compressing the sealing ring on the spigoted pipe-end. The inside of the socketed pipe-end may be lubricated, e.g., with castor oil, which may also be applied to the flexible locking rod to assist its insertion.

Suitable materials for the pipes, sleeve or sleeves and collar are polyvinylchloride, or polypropylene. Suitable materials for the thrust rod are polyvinylchloride, polyethylene, polypropylene, or nylon, and the sealing ring may be made of rubber or any other suitable elastomeric material.

Two embodiments of the invention will now be described, by way of example only, with reference to the accompanying drawings, in which:

FIG. 1 is a fragmentary longitudinal section of one form of pipe coupling according to the invention; and FIG. 2 corresponds to FIG. 1, but shows two forms of pipe coupling according to the invention.

In FIG. 1 a pipe coupling for socketed and spigoted plastics pipes 1A, 1B respectively, comprises a portion 2 of the spigoted pipe-end 3 spaced from its ultimate end 4 expanded so as to be a close sliding fit in the socketed pipe-end 5, a plastics sleeve 6 being secured within the expanded portion 8 of the spigoted pipe-end between the expanded portion 2 and the ultimate end 4. The sleeve 6 prevents the expanded portion 2 returning to its original diameter, and, therefore, the expanded portion always serves to prevent the sealing ring 7 from being forced out of the coupling by pressure from within the coupled pipes 1A, 1B. The socketed pipe-end 5 is encircled by a collar 9 to provide additional strength to withstand the pressure from within the coupled pipes.

A second portion 10 of the spigoted pipe-end 3 is expanded to the same diameter as the first expanded portion 2, to form a circumferential groove 11 round the outside of the spigoted pipe-end, and a portion 12 of the socketed pipe-end 5 is expanded (along with the corresponding portion 13 of the collar 9) to form a circumferential groove 14 round the inside of the socketed pipe-end, which groove when mated with the groove 11 receives a flexible locking rod 15 inserted through a hole (not shown) in the socketed pipe-end 5 and the collar 9 tangential to the groove 14, to lock the coupling to prevent the two pipes 1A, 1B from pulling apart. The second expanded portion 10 of the spigoted pipe-end is provided with its own sleeve 16, but in FIG. 2 (in which like reference numerals represent like parts in FIG. 1) an extension 17 of the sleeve 6 serves the same purpose of preventing pushing of one pipe with respect to the other resulting in the locking rod 15 rolling or pushing the second expanded portion 10 back towards the original pipe diameter.

In both embodiments the ultimate end 18 of the spigoted pipe-end 5 is bevelled internally to provide a lead-in for compressing the sealing ring 7 on the spigoted pipe-end 3.

What I claim is:

1. A pipe coupling including substantially rigid socketed and spigoted plastic pipes of substantially constant and equal wall thickness and nominal diameter, the socket and the inserted spigot integrally pre-formed in the pipe with a sealing ring therebetween and comprising:

a first portion of the spigot spaced from its ultimate end expanded so as to be a close sliding fit in the socket, said socket being expanded to receive said first portion so that no reduction of the nominal diameter of said pipes including the coupling is necessary, a second portion of the spigot between the expanded portion and the ultimate end of the spigot, said second portion being substantially the same nominal diameter as said pipes, said sealing ring being located on said second portion and cooperating with said expanded socket, a third and expanded portion of the spigot still farther from the ultimate end of the spigot than said second portion, the two expanded portions forming between them a circumferential indentation round the outside of the spigot, said indentation being substantially the same nominal diameter as said pipes, a portion of the expanded socket being expanded still further to form a circumferential groove round the inside of the socket mating with said indentation on the spigot and a flexible locking rod inserted through a hole in the socket tangential to the mated indentation and groove to lock the coupling against axial separation.

2. A pipe coupling as in claim 1, wherein the socket is encircled by a reinforcing collar, said collar having an enlarged portion to accommodate the groove forming expansion of said socket.

3. A pipe coupling as in claim 1, wherein the first and third expanded portions of the spigot are provided with internal reinforcing sleeves, said sleeves being substantially the same nominal diameter as said pipes.

4. A pipe coupling as in claim 3, wherein the sleeves for said first and third expanded portions of the spigot are provided with an annular connection to resist deformation of the spigot.

* * * * *